Patented Jan. 19, 1926.

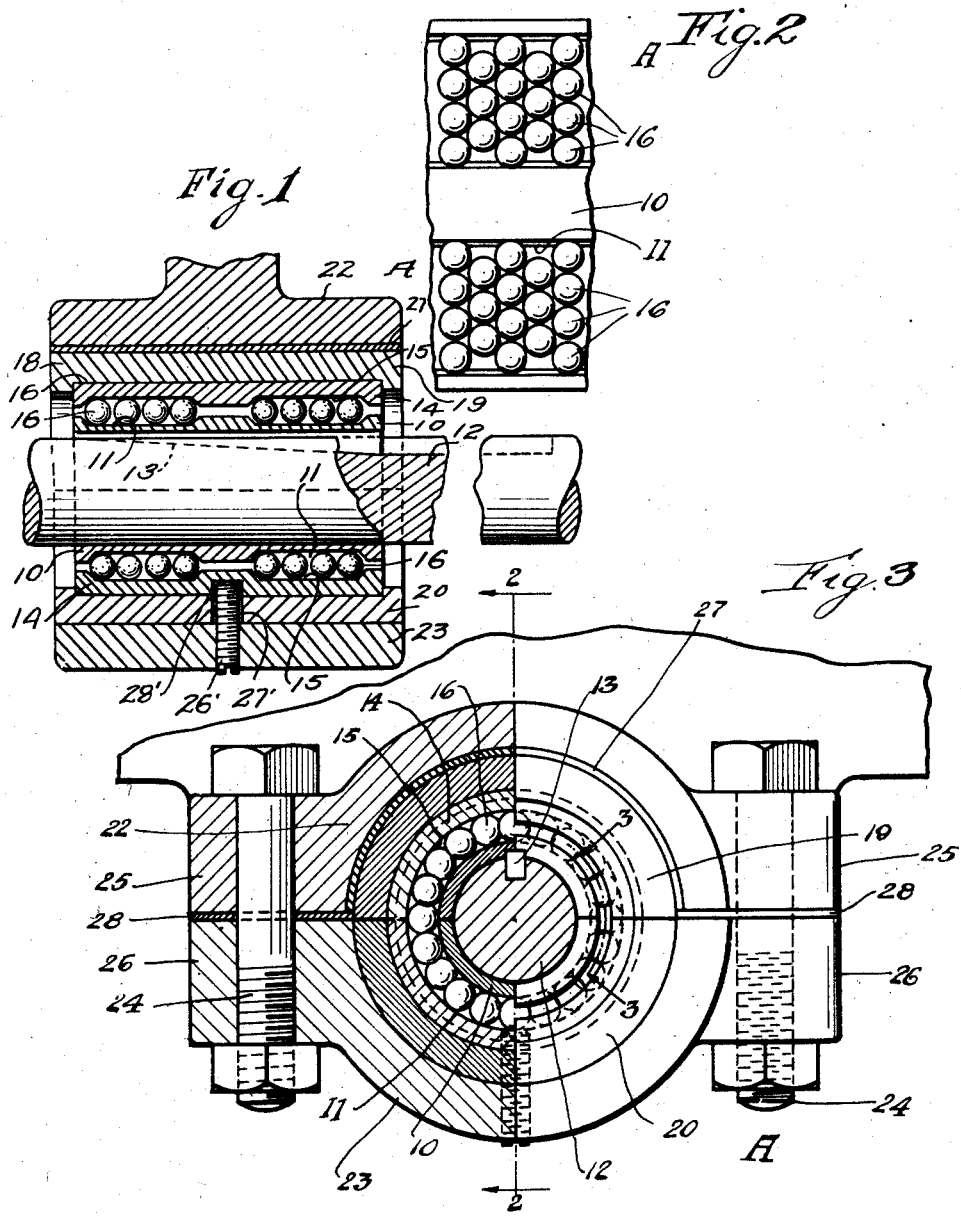

1,570,056

UNITED STATES PATENT OFFICE.

LEWIS FRITZ, OF CHICAGO, ILLINOIS.

BEARING.

Application filed July 8, 1922, Serial No. 573,717. Renewed July 3, 1925.

*To all whom it may concern:*

Be it known that I, LEWIS FRITZ, a citizen of the United States, and a resident of the city of Chicago, county of Cook, and State of Illinois, have invented certain new and useful Improvements in Bearings, of which the following is a specification.

My invention relates to new and useful improvements in bearings especially designed to be used in connection with the crank-shaft and cam-shaft of a gasoline engine and has for its principal object the provision of an improved construction of this character, which will be highly efficient in use and economical in manufacture.

A further contemplation of the invention is the provision of a bearing designed to be used in connection with the crank-shaft and cam-shaft of a gasoline engine, the construction being of such nature that the various parts comprising the bearing can be readily dismantled for the purpose of repairs and readily assembled after such repairs have been made.

Other objects will appear hereinafter.

The invention consits in the combinations and arrangements of parts hereinafter described and claimed.

The invention will be best understood by reference to the accompanying drawings forming a part of this specification, and in which, Fig. 1 is a sectional detail view of my improved bearing taken substantially on line 2—2 of Fig. 4, Fig. 2 is a fragmentary detail view of one of the bearing racers showing the arrangement of the ball bearings embodying the invention, taken substantially on line 3—3, Fig. 4, and Fig. 3 is a side elevational view of my improved bearing.

In carrying out the invention, my improved bearing A comprises an inner race ring 10 provided with oppositely disposed channels 11 and fixedly secured to a shaft 12, which in this instance is a crank-shaft of an internal combustion engine, by a wedge shaped key 13. The purpose of fixing the lower race ring 10 to the shaft 12 by means of a wedge shaped key 13 is to enable one to remove the key when it is desired or occasion requires to remove the inner race ring 10. Associated with the bottom race ring 10 is an outer race ring 14 also provided with oppositely disposed channels 15 which register with the channels 11 of the race ring 10. Arranged to engage the channels 11 and 15 are ball bearings 16 which in this instance are arranged in parallel rows consisting alternately of 3 and 4 ball bearings. While I prefer to use alternating rows of bearings consisting of balls 4 and 3 to the row, this number may be varied as desired or as the occasion arises, depending on the size of the bearing. This construction so far set forth constitutes my improved roller bearing which I prefer to make into two semi-circular parts as shown in Fig. 1. The upper part of the roller bearing, as illustrated in the drawings, is mounted in a recess 16 formed in a holder or shell 18, which I prefer to make into two portions 19 and 20. The portion 19 of the roller bearing holder is mounted in the upper half of the bearing block 22 which is integral with the motor block of an internal combustion engine and the lower portion 20 of the holder is mounted to seat in the bearing cap 23 which is fixed to the bearing portion 22 by suitable nut receiving bolts 24. Both bearing portions 22 and 23 are provided with lateral ears 25 and 26 through which nut receiving bolts 24 pass for securing the bearing portions together. In order to prevent the portions 19 and 20 of the holder and the outer race ring of the ball bearing from rotating with the shaft, I provide a headless screw member 26' which is screw-threaded through the part 23 with an end inserted in bores 27' and 28' formed in the holder portion and lower portion of the outer race ring, as indicated in Fig. 1.

After mounting the bearing in position and it is found that the shaft 12 is not in true alignment, to bring the shaft into true alignment a semi-circular shaped shim 27 and shim portions 28 can be employed, in the manner illustrated in Fig. 3, the thickness and number of said shims being determined according to the extent the shaft 12 is out of alignment.

It will be seen by my improved bearing that I am able to take the bearing apart with very little trouble and I am also able to mount a ball bearing roller in the bearing of various sizes, that is in diameter, to accommodate any size shaft without creating friction.

My improved bearing can be made in various sizes, and the construction is such, that almost anyone mechanically inclined can take the bearing apart for the purpose of repairs and assemble the same in a short time with little trouble.

The construction is of such simplicity that I am able to manufacture my improved bearing at a nominal cost and the advantages of the bearing will be of great commercial value.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A ball bearing of the class described including an inner race ring comprising parts having opposite channels formed therein and adapted to be mounted to embrace a shaft with one of the parts keyed to the shaft, an outer race ring comprising parts provided with opposite channels, a series of balls arranged between the race rings for operation in the channels, a shell comprising parts provided with recesses adapted to accommodate the race ring parts, said shell and the lower part of the outer race being provided with registering bores, and a member adapted to be mounted with an end inserted in the bores.

2. A ball bearing of the class described including an inner race ring having opposite channels formed therein, an outer race ring having opposite channels formed therein, a series of balls arranged between the race rings for operation in the channels, a shell provided with recesses adapted to accommodate the outer race ring, said shell and said outer race ring being provided with registering bores, and a member adapted to be mounted with an end inserted in the bores.

In testimony whereof I have signed my name to this specification.

LEWIS FRITZ.